(12) United States Patent
Stefani

(10) Patent No.: US 7,674,164 B2
(45) Date of Patent: Mar. 9, 2010

(54) AIR-CONDITIONING SYSTEM FOR THE PASSENGER COMPARTMENT OF A VEHICLE

(75) Inventor: Giovanni Stefani, Sassuolo (IT)

(73) Assignee: Ferrari S.p.A., Modena (IT)

( * ) Notice: Subject to any disclaimer, the term of this patent is extended or adjusted under 35 U.S.C. 154(b) by 555 days.

(21) Appl. No.: 10/583,551

(22) PCT Filed: Dec. 15, 2004

(86) PCT No.: PCT/IB2004/004198

§ 371 (c)(1),
(2), (4) Date: May 24, 2007

(87) PCT Pub. No.: WO2005/061250

PCT Pub. Date: Jul. 7, 2005

(65) Prior Publication Data

US 2007/0277548 A1 Dec. 6, 2007

(30) Foreign Application Priority Data

Dec. 15, 2004 (IT) .......................... BO2003A0765

(51) Int. Cl.
*B60H 1/34* (2006.01)
*B60H 1/00* (2006.01)
(52) U.S. Cl. .......................... 454/154; 454/69; 454/143; 454/152
(58) Field of Classification Search .................. 454/69, 454/152, 153, 154, 155, 286, 305, 334, 143
See application file for complete search history.

(56) References Cited

U.S. PATENT DOCUMENTS

| | | | | | |
|---|---|---|---|---|---|
| 1,502,745 | A | * | 7/1924 | Price | 454/154 |
| 1,514,329 | A | * | 11/1924 | Metcalf | 454/120 |
| 1,759,001 | A | | 5/1930 | Cherry et al. | |
| 1,799,327 | A | * | 4/1931 | Seacord | 454/69 |
| 2,814,978 | A | * | 12/1957 | Sallou | 454/245 |
| 3,659,515 | A | * | 5/1972 | Galaniuk | 454/152 |
| 3,702,503 | A | * | 11/1972 | Nichols | 34/114 |
| 3,736,858 | A | * | 6/1973 | Mercier | 454/286 |
| 3,878,621 | A | * | 4/1975 | Duerre | 34/90 |
| 4,558,526 | A | * | 12/1985 | Baus | 34/232 |
| 5,176,567 | A | * | 1/1993 | Piritore et al. | 454/155 |
| 6,083,099 | A | * | 7/2000 | Brown | 454/121 |

FOREIGN PATENT DOCUMENTS

| | | | |
|---|---|---|---|
| DE | 3301570 A1 | * | 7/1984 |
| JP | 2001097037 | | 4/2001 |
| JP | 2003094933 | | 4/2003 |

* cited by examiner

*Primary Examiner*—Steven B McAllister
*Assistant Examiner*—Patrick F. O'Reilly, III
(74) *Attorney, Agent, or Firm*—Oblon, Spivak, McClelland, Maier & Neustadt, L.L.P.

(57) ABSTRACT

An air-conditioning system for the passenger compartment of a vehicle. The air-conditioning system includes an air-treatment unit and with a series of ventilation outlets distributed inside the passenger compartment and connected to the air-treatment unit. Some of the ventilation outlets are mounted on the side surface of a tubular body, which is set in a bottom portion of the passenger compartment. An internal pipe communicates with the air-treatment unit, and is mounted to oscillate about a longitudinal axis thereof.

7 Claims, 2 Drawing Sheets

AIR-CONDITIONING SYSTEM FOR THE PASSENGER COMPARTMENT OF A VEHICLE

TECHNICAL FIELD

The present invention relates to an air-conditioning system for the passenger compartment of a vehicle.

The present invention finds advantageous application in an air-conditioning system for the passenger compartment of a motor vehicle, to which the ensuing treatment will make explicit reference without this implying any loss of generality.

BACKGROUND ART

In modern motor vehicles there is always present an air-conditioning system, which is designed to condition the passenger compartment introducing into the passenger compartment itself air at the temperature desired by the user. For this purpose, the air-conditioning system comprises a unit for treatment of the air, which is designed to heat or cool the air that is subsequently introduced into the passenger compartment by a series of ventilation outlets made in the passenger compartment itself.

Normally, inside the passenger compartment, the ventilation outlets are arranged at different levels so as to enable introduction of the air into different areas of the passenger compartment itself. In particular, there are by now always present top ventilation outlets designed to direct air towards the internal wall of the windscreen, intermediate ventilation outlets designed to direct the air towards the driver's body and the body of the passenger occupying the front seat, and bottom ventilation outlets designed to direct the air towards the feet of the driver and of the passenger occupying the front seat. Typically, only the intermediate ventilation outlets are mobile so as to enable regulation of the direction of the air introduced into the passenger compartment, whilst the top and bottom ventilation outlets are fixed and do not enable regulation of the direction of the air introduced into the passenger compartment.

DISCLOSURE OF INVENTION

The purpose of the present invention is to provide an air-conditioning system for the passenger compartment of a vehicle, which will be easy and inexpensive to produce and, at the same time, will provide the driver or the passenger occupying the front seat with a wider range of possibilities of regulation of the air introduced into the passenger compartment.

In accordance with the present invention, an air-conditioning system for the passenger compartment of a vehicle is provided.

BRIEF DESCRIPTION OF THE DRAWINGS

The present invention will now be described with reference to the annexed plate of drawings, which illustrates a non-limiting example of embodiment thereof, and in which.

BEST MODE FOR CARRYING OUT THE INVENTION

Figure 1:
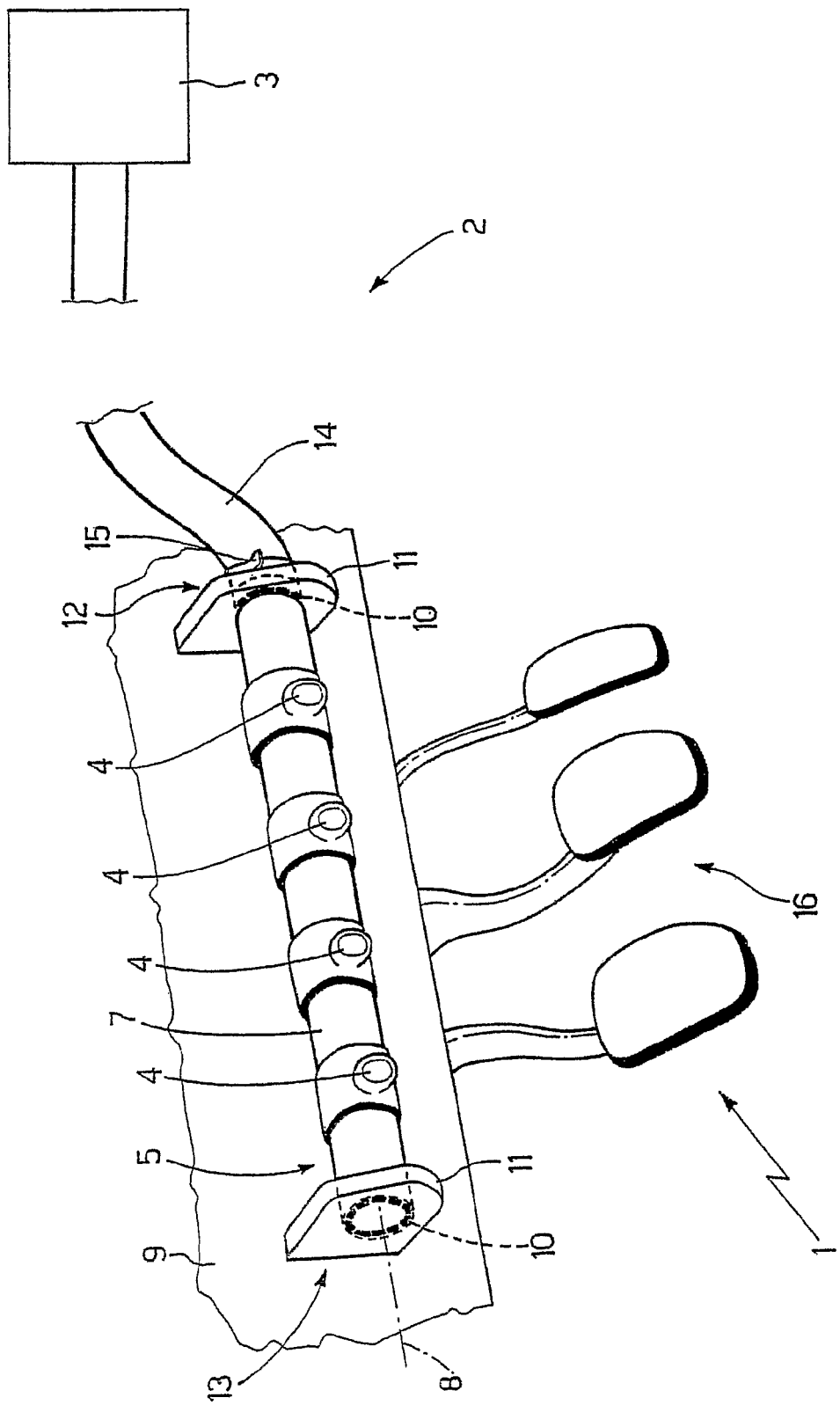
FIG. 1 is a perspective and schematic view of a bottom portion of the passenger compartment of a motor vehicle provided with the air-conditioning system forming the subject of the present invention.

In FIG. 1, the reference number 1 designates the passenger compartment of a motor vehicle provided with an air-conditioning system 2, which comprises an air-treatment unit 3 housed in a engine compartment (not illustrated) and designed to treat the air that must be introduced into the passenger compartment 1. Connected to the air-treatment unit 3 is a plurality of ventilation outlets 4, which have the function of introducing into the passenger compartment 1 the air treated by the air-treatment unit 3, are distributed inside the passenger compartment 1, and are arranged at different levels in order to enable introduction of air into different areas of the passenger compartment 1 itself. In particular, the ventilation outlets 4 comprise: top ventilation outlets 4 (not illustrated in detail) designed to direct the air towards the internal wall of a windscreen; intermediate ventilation outlets 4 (not illustrated in detail) designed to direct the air towards the body of the driver and the body of the passenger occupying the front seat; and bottom ventilation outlets 4 (illustrated in the attached figures) designed to direct the air towards the feet of the driver and of the passenger occupying the front seat.

The air-conditioning system 2 comprises a tubular body 5 set in a bottom portion of the passenger compartment 1, and an internal pipe 6 communicating with the air-treatment unit 3, and is provided with a number of bottom ventilation outlets 4 mounted on the side surface 7 of the tubular body 5. In particular, the ventilation outlets 4 are mounted on the tubular body 5 so as to be able to oscillate about a longitudinal central axis 8 of the tubular body 5 between two limit positions (illustrated in FIG. 2). The regulation of the directionality of the bottom ventilation outlets 4 about the central axis 8 enables ventilation of an area that starts from the driver's toes and reaches as far as lapping the surface of the knee protection, thus enabling the air to flow upwards "sticking" to the limit layer of the dashboard surface.

According to the embodiment illustrated in FIG. 1, the ventilation outlets 4 are mounted in a fixed position on the side surface 7 of the tubular body 5, and the tubular body 5 is mounted so as to be able to oscillate about its longitudinal central axis 8. In this way, all the ventilation outlets 4 oscillate in the same way together with the tubular body 5 and about the longitudinal central axis 8 of the tubular body 5.

Figure 2:
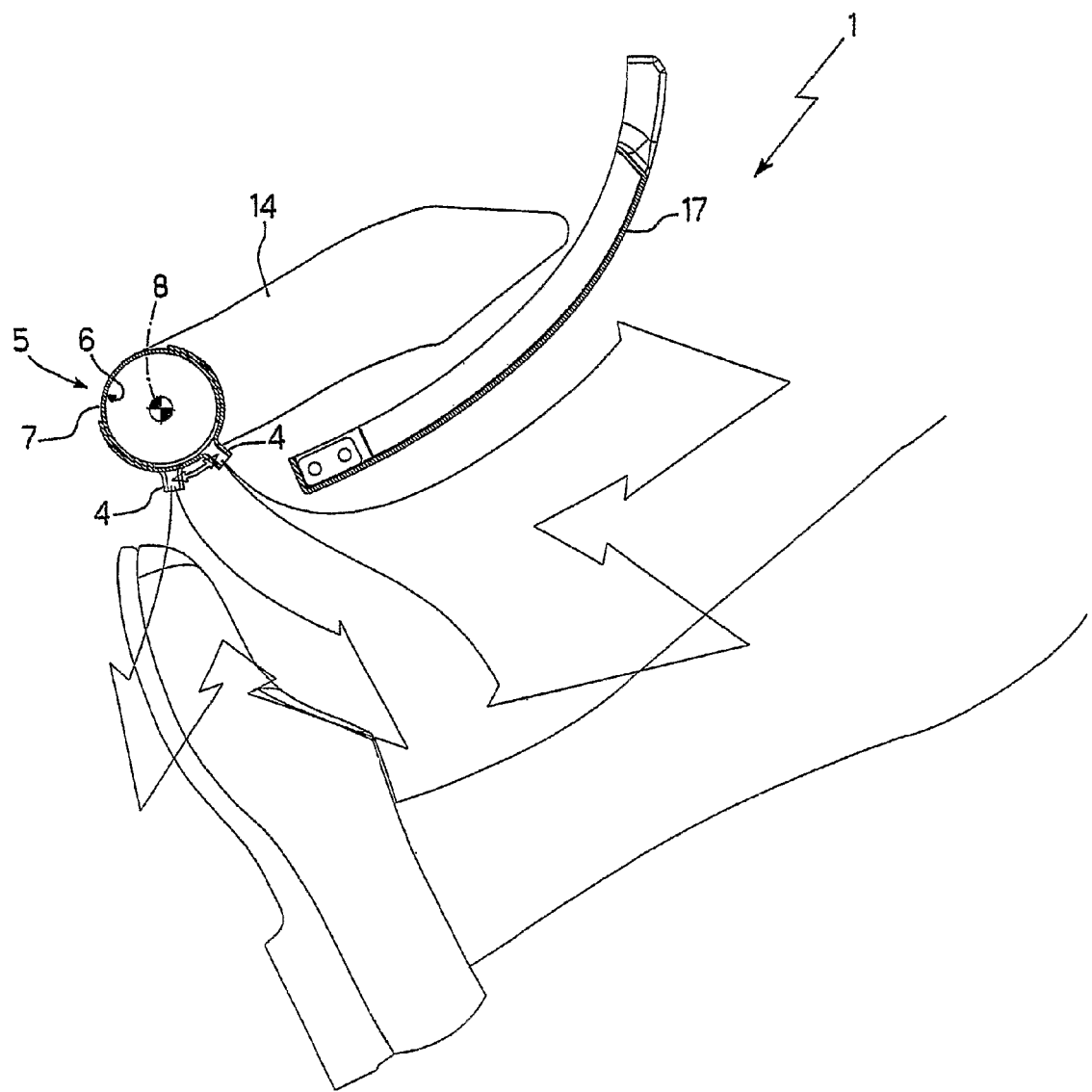
FIG. 2 is a partially sectioned side elevation of a detail of FIG. 1.

According to a different embodiment illustrated in FIG. 2, the tubular body 5 is mounted in a fixed position, and the ventilation outlets 4 are mounted on the side surface 7 of the tubular body 5 so as to be able to oscillate about the longitudinal central axis 8 of the tubular body 5. In this way, each ventilation outlet 4 can oscillate about the longitudinal central axis 8 of the tubular body 5 independently of the other ventilation outlets 4.

According to what is illustrated in FIG. 1, the tubular body 5 is supported by a wall 9 of the passenger compartment 1 by means of interposition of a pair of bearings 10, which are fixed to two respective brackets 11 connected to the wall 9. Preferably, the bearings 10 are made in such a way that the oscillation of the tubular body 5 about its longitudinal axis 8 occurs against a given force of friction, which is designed to maintain the tubular body 5 immobile in a given angular position in the absence of the action of external forces.

According to what is illustrated in FIG. 1, the tubular body 5 has one open end 12 in communication with the air-treatment unit 3 and one closed end 13 opposite to the end 12. The open end 12 is in communication with the air-treatment unit 3 by means of a pipe 14, which is mounted in a fixed position and has one end slidably coupled to the end 12 of the tubular body 5.

Preferably, in a position corresponding to the open end 12, the tubular body 5 comprises a regulation member 15 designed to vary the size of the section of passage of the air between a minimum value (normally zero) and a maximum value.

According to an embodiment not illustrated, the tubular body 5 has a handle designed to be grasped by a user for imparting on the tubular body 5 itself an oscillation about its longitudinal axis 8.

According to what is illustrated in the attached figures, the tubular body 5 is arranged in a position corresponding to a set of pedals 16 of the vehicle, and is preferably arranged immediately behind a panel 17 of the passenger compartment 1 so as to be normally not visible to the driver and/or to the passenger of the motor vehicle.

Fabrication of the tubular body 5 described above proves extremely simple and inexpensive. Furthermore, various on-road tests have demonstrated that the tubular body 5 enables an effective and ergonomic regulation of the flows of air coming from the bottom ventilation outlets 4. In fact, regulation of the directionality of the bottom ventilation outlets 4 enables ventilation of an area that starts from the driver's toes and reaches as far as lapping the surface of the knee protection thus enabling the air to flow upwards "sticking" to the limit layer of the dashboard surface.

The invention claimed is:

1. An air-conditioning system for a passenger compartment of a vehicle, comprising:
    an air-treatment unit;
    a plurality of bottom ventilation outlets distributed inside the passenger compartment, connected to the air-treatment unit and configured to direct air towards feet of a driver; and
    a tubular body set horizontally in a bottom portion of the passenger compartment and including an internal pipe communicating with the air-treatment unit and the plurality of bottom ventilation outlets mounted on an external side surface of the tubular body and protruding outwardly therefrom, the plurality of bottom ventilation outlets being mounted on the tubular body and configured to oscillate about a horizontal longitudinal central axis of the tubular body between two limit positions for regulation of a directionality of the plurality of bottom ventilation outlets,
    wherein the tubular body is arranged horizontally above a set of pedals of the vehicle, and is arranged immediately behind a knee protection panel of the passenger compartment, and
    wherein the regulation of the directionality of the plurality of bottom ventilation outlets about the horizontal longitudinal central axis enables ventilation of an area starting from toes of the driver and lapping a surface of the knee protection panel, enabling the air to flow upwards and sticking to a limit layer of a dashboard surface.

2. The air-conditioning system according to claim 1, wherein the tubular body is mounted in a fixed position, and the plurality of bottom ventilation outlets are mounted on the side surface of the tubular body and configured to oscillate about the longitudinal central axis of the tubular body.

3. The air-conditioning system according to claim 1, wherein the plurality of bottom ventilation outlets are mounted in a fixed position relative to the tubular body on the side surface of the tubular body, and the tubular body is mounted to be configured to oscillate about the longitudinal central axis.

4. The air-conditioning system according to claim 3, wherein the tubular body is supported by a wall of the passenger compartment by interposition of a pair of bearings fixed to two respective brackets connected to the wall.

5. The air-conditioning system according to claim 3, wherein oscillation of the tubular body about the longitudinal axis occurs against a force of friction which maintains the tubular body immobile in an angular position in an absence of external forces.

6. The air-conditioning system according to claim 3, wherein the tubular body includes a first open end in communication with the air-treatment unit by a pipe mounted in a fixed position and having one end thereof slidably coupled to a first end of the tubular body.

7. The air-conditioning system according to claim 1, wherein
    the tubular body includes a first, open end in communication with the air-treatment unit and a second, closed end opposite the first end, and
    at the first end, the tubular body includes a regulation member configured to vary a size of a section of passage of air between a minimum value and a maximum value.

* * * * *

UNITED STATES PATENT AND TRADEMARK OFFICE
CERTIFICATE OF CORRECTION

| | | |
|---|---|---|
| PATENT NO. | : 7,674,164 B2 | Page 1 of 1 |
| APPLICATION NO. | : 10/583551 | |
| DATED | : March 9, 2010 | |
| INVENTOR(S) | : Stefani | |

It is certified that error appears in the above-identified patent and that said Letters Patent is hereby corrected as shown below:

On the title page, Item (30), the Foreign Application Priority Data is incorrect. Item (30) should read:

-- (30)         Foreign Application Priority Data

Dec. 19, 2003   (IT) ..............................BO2003A0765 --

Signed and Sealed this

Twenty-fifth Day of May, 2010

David J. Kappos
*Director of the United States Patent and Trademark Office*